United States Patent [19]

Saussy

[11] Patent Number: 5,936,963
[45] Date of Patent: Aug. 10, 1999

[54] SYSTEM TO IMPLEMENT A SWITCHED ETHERNET SERVICE WITHIN A GEOGRAPHICALLY DISTRIBUTED REGION USING ASYMMETRIC FULL DUPLEX CIRCUITS

[75] Inventor: Gordon C. Saussy, 123 Parker Rd., Wellesley, Mass. 02181

[73] Assignees: Gordon C. Saussy, Potomac, N.Y.; John James McGlew, Potomac, N.Y.; part interest to each

[21] Appl. No.: 08/838,714

[22] Filed: Apr. 9, 1997

[51] Int. Cl.$^6$ .................................................. H04C 12/413
[52] U.S. Cl. ........................... 370/447; 370/466; 370/448; 395/200.63; 395/200.8
[58] Field of Search .................................... 370/432, 437, 370/438, 445, 446, 447, 448, 463, 464, 465, 466, 467, 468, 485, 486, 276, 282, 285, 294, 401; 348/7, 10, 12, 16; 395/200.63, 200.79, 200.8, 200.81, 200.82

[56] References Cited

U.S. PATENT DOCUMENTS

| | | | |
|---|---|---|---|
| 4,748,637 | 5/1988 | Bishop et al. | 370/463 |
| 5,347,304 | 9/1994 | Moura et al. | 348/12 |
| 5,485,584 | 1/1996 | Hausman et al. | 395/842 |
| 5,574,949 | 11/1996 | Tsurumi | 395/850 |
| 5,594,789 | 1/1997 | Seazholtz et al. | 379/207 |
| 5,650,994 | 7/1997 | Daley | 370/259 |
| 5,684,799 | 11/1997 | Bigham et al. | 370/397 |
| 5,712,903 | 1/1998 | Bartholomew et al. | 379/89 |
| 5,727,149 | 3/1998 | Hirata et al. | 395/200.01 |
| 5,812,786 | 9/1998 | Seazholtz et al. | 395/200.63 |

*Primary Examiner*—Douglas W. Olms
*Assistant Examiner*—Seema S. Rao
*Attorney, Agent, or Firm*—McGlew and Tuttle, P.C.

[57] ABSTRACT

A system using a public access medium to establish asymmetric full-duplex circuits connecting a premises device and a central device. The premises device converts a standard Ethernet interface into the asymmetric full-duplex link. The central device aggregates traffic from a plurality of asymmetric links into one or more local ethernet connection. The premises device is attached to any network node (such as a personal computer, LAN bridge/router, terminal server, etc.) which offers an ethernet interface. The device thereby emulates an Ethernet LAN so that the network node's operation is transparent. Such an Ethernet to asymmetric converter is provided at one end of the asymmetric full-duplex link. The central device aggregates traffic from several asymmetric links into one or more Ethernet connection. This device inspects Ethernet packets as they are transferred in order to determine which physical ports should receive a packet. This device resembles or is provided as a local area network bridge. However, according to a preferred form of the invention, the bridge function is provided in the form of an asymmetric Ethernet multiplexer (AEM) which operates in the form of a multiplexer.

15 Claims, 3 Drawing Sheets

EAC BLOCK DIAGRAM

SYSTEM TO IMPLEMENT A SWITCHED ETHERNET SERVICE WITHIN A GEOGRAPHICALLY DISTRIBUTED REGION USING ASYMMETRIC FULL DUPLEX CIRCUITS

FIELD OF THE INVENTION

The present invention relates to communication systems in general and more particularly to communication systems using asymmetric full duplex circuits (such as are proposed for asymmetric digital subscriber loop, or ADSL).

BACKGROUND OF THE INVENTION

Computer-to-computer data networking today is a very diverse and broad field. It has traditionally been divided into two categories: Local Area Networks (LANs) and Wide Area Networks (WANs). The following characteristics have classically distinguished LANs from WANs:

LANs exist within a single customer site, with the physical medium itself (copper twisted pair cabling, coaxial cabling and/or fiber optic cabling) being owned by the customer and used exclusively for the LAN service. LANs have generally been connectionless in nature (all users attached to a LAN are implicitly assumed to be able to access each other) and usually support multipoint messages (one user simultaneously talking to many users) as well as point to point messages.

WANs interconnect customer sites across wiring infrastructures owned by telecommunications providers (examples: AT&T, MCI, Nynex, US West etc.); these wiring infrastructures are generally also used to carry voice services (telephone). WANs have generally been circuit-oriented in nature (communications take place only after an explicit connection between two communicating users is established) and usually do not support multipoint messaging easily.

Historically, WANs speeds have been very low as compared to LANs due to limitations of the telecommunications infrastructure. WAN costs have also been very high, limiting the deployment of WANs to interconnection of large customer premises sites. However, three factors have together created new demands for WAN connectivity and services:

Increased use of LANs within enterprises has made it imperative that all employees of the enterprise have access to the LAN, even those located in small remote offices.

More and more workers are "telecommuting"—working from home—and require access to the enterprise LAN.

Rapid expansion of the Internet has created consumer demand for network access to the home.

The classic WAN configuration—interconnection of primary enterprise sites—is now referred to as a "Backbone WAN". WAN configurations which support frequent, intermittent access by remote users in the categories above are termed "Access WANs". The invention relates primarily to Access WAN configurations.

The Access WAN is constrained to operate over the existing telecommunications infrastructure. There are alternatives proposed which utilize the cable television infrastructure. For most households and small offices, this means the access WAN must operate over the existing copper wiring (generally two pairs—twisted pair, termed the subscriber loop) which provide voice service today. This is a significant constraint for the technologies used.

Multiple technologies exist and are proposed for implementation of Access WANs. The most common of these is the analog modem. With an analog modem, users can dial into access server devices in enterprises and establish connections over the existing telephone network, at data rates up to about 30 kilobits/second. This has become the most common technique for telecommuters and Internet users. However, the speeds achievable with analog modems appear to be reaching fundamental physical limits, and only provide marginal service for data-intensive network transactions.

Integrated Services Digital Network, or ISDN, is an alternative technology which is frequently used in Access WANs. ISDN enables bidirectional communication at 64 or 128 kilobits/second, offering somewhat better performance than analog modems. However, telecommunications providers in the United States have been slow to deploy ISDN due to the large infrastructure upgrades required, and both availability and pricing of the service have suffered. ISDN has also been problematic for users due to its high complexity.

Asymmetric Digital Subscriber Loop, or ADSL, is a technology proposed for use in Access WANs. ADSL is a high-speed modem technology originally developed for Video-on-Demand services. It enables a full-duplex communications path on existing copper wiring with an asymmetric data rate: the data path from the subscriber to the Central Office operates between 64 and 640 kilobits/second, while the data path from the Central Office to the subscriber operates between 1.5 and 9 Megabits/second. Significantly, ADSL may operate over the existing telecommunications infrastructure without substantial investment, and is transparent to voice services.

With the use of ADSL, a high-speed bidirectional communications path may be established between a household or small office and the local telecommunications provider's Central Office. This is a critical building block for an Access WAN but does not provide a complete system; many additional decisions are now required to build an end-to-end interoperable solution. An ad-hoc standards body called the ADSL Forum has been formed to work on these standards.

Implementation of an ADSL-based Access WAN fundamentally requires three elements:

1. An interface device which resides in the customer premises and connects local data traffic to the ADSL link. This must include the ADSL modem technology and intelligence to convert local data traffic to the appropriate format.

2. An aggregation device which resides in the central office and integrates many ADSL links together for presentation to the inter-Central Office WAN backbone.

3. A common convention between the two devices above for data formats to be used on the ADSL link, as well as a consistent communications paradigm (LAN-oriented connectionless/multicast versus WAN-oriented circuit-based).

It is generally assumed that the WAN backbone between central offices will be implemented using dedicated or switched virtual circuits over a connection-oriented technology such as Asynchronous Transfer Model (ATM). Similarly, it is generally assumed that within the customer premises (such as a small office), there will be a small Ethernet LAN (connectionless and supporting multicast messaging).

The ADSL Forum has outlined three potential models for communication between these disparate networks:

A. Transfer data over the ADSL link using Ethernet data formats, and convert the data to WAN formats in the Central Office.

B. Transfer data over the ADSL link using Frame Relay data formats; conversion from Ethernet to Frame Relay is done in the customer premises.

C. Transfer data over the ADSL link using ATM data format; conversion from Ethernet to ATM is done in the customer premises.

Both transfer data over the ADSL link using Frame Relay data formats; conversion from Ethernet to Frame Relay is done in the customer premises and transfer data over the ADSL link using ATM data format; conversion from Ethernet to ATM is done in the customer premises require use of a costly and complex LAN to WAN conversion device in the customer premises.

SUMMARY AND OBJECTS OF THE INVENTION

It is an object of the invention to provide a communication system which takes advantage of existing technologies to the greatest extent including taking advantage of the existing WAN investment in infrastructure. The system uses asymmetric full duplex circuits over twisted pair links wherein existing Carrier Sense Multiple Access with Collision Detection (CSMA/CD—IEEE 802.3 Ethernet) hardware and software is used extensively. The system preferably implements a switched ethernet service within a geographically distributed region (such as a metropolitan area) while preserving the network characteristics of ethernet (thereby minimizing the requirement of software development and interconnection equipment development).

According to the invention, a system is provided wherein a public access medium is used to establish asymmetric full-duplex circuits connecting a premises device and a central device. The premesis device converts a standard ethernet interface into the asymmetric full-duplex link. The central device aggregates traffic from a plurality of asymmetric links into one or more local ethernet connection.

According to a further feature of the invention, the premises device is attached to any network node (such as a personal computer, LAN bridge/router, terminal server, etc.) which offers an ethernet interface. The device thereby emulates an ethernet LAN so that the network node's operation is transparent. Such an Ethernet to asymmetric converter is provided at one end of the asymmetric full-duplex link.

According to a further object of the invention, the central device aggregates traffic from several asymmetric links into one or more Ethernet connection. This device includes means for inspecting ethernet packets as they are transferred in order to determine which physical ports should receive a packet. This device resembles or is provided as a local area network bridge. According to a preferred form of the invention, the bridge function is provided in the form of an asymmetric ethernet multiplexer (AEM) which operates in the form of a multiplexer.

The EAC is preferably a simple device. The preferred EAC contains a logical state machine and two FIFO memories. It offers one Asymmetric Link port and one Ethernet-port. The EAC operates as follows:

It receives data packets from the Asymmetric link at speeds up to 9 MBits/sec, and transfers these onto the local Ethernet port.

To insure the local Ethernet (capable of running at up to 10 MBits/sec) is able to receive this traffic and is not busy, the EAC operates in an "aggressive" manner by not implementing the exponential backoff algorithm specified in the Ethernet standard. Instead, following a collision, the EAC always begins retransmission immediately after the Ethernet Interpacket Gap has expired. This will insure that the Asymmetric link can always "acquire" the Ethernet LAN if it needs to transmit data.

The EAC receives data packets from the local Ethernet port (at 10 MBits/sec), and transfer these onto the Asymmetric link (assuming a transmission rate of up to 640 kbps).

To insure the local Ethernet does not demand more bandwidth than the Asymmetric link is capable of providing, the EAC generates local collisions onto the Ethernet by transmitting "dummy" packets, forcing the local network node into its exponential backoff. The combination of the two algorithms described above will "match" the effective data rate in both the transmit and receive direction on the local Ethernet to the available data rate on the Asymmetric link, as long as (a) the sum of the transmit and receive data rates on the asymmetric link does not exceed 10 Mbits/sec, and (b) the receive data rate on the asymmetric link is much higher than the transmit data rate. Note that the data rates specified for ADSL always meet the above criteria.

The AEM is a more sophisticated device than the EAC. It offers a large number of Asymmetric Link ports with transmit and receive inverted (so that many EACs can connect to the AEM). It also offers one or more Ethernet ports which may operate at either 10 MBit or 100 MBit speeds, either in half-duplex (standard) or full-duplex (switched enhanced) mode. All operation of the Ethernet ports is fully compliant with Ethernet standards, enabling connection to any device.

The data paths within the AEM will be referred to as "Forward"(from the many Asymmetric ports to the local Ethernets) and "Reverse"(from the local Ethernets to the Asymmetric ports).

The AEM resembles a LAN bridge in some respects but is in fact only multiplexing the forward and reverse data paths—it is not enabling "any to any" communication among its ports. This simplifies its design considerably and thereby reduces the cost and complexity of the overall solution. Note that the AEM could be replaced with a conventional LAN interconnect device (Bridge or Router) using "inverted" EACs on its interfaces and the system would still operate. However, the simplified multiplexing of the AEM is viewed as a valuable enhancement.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
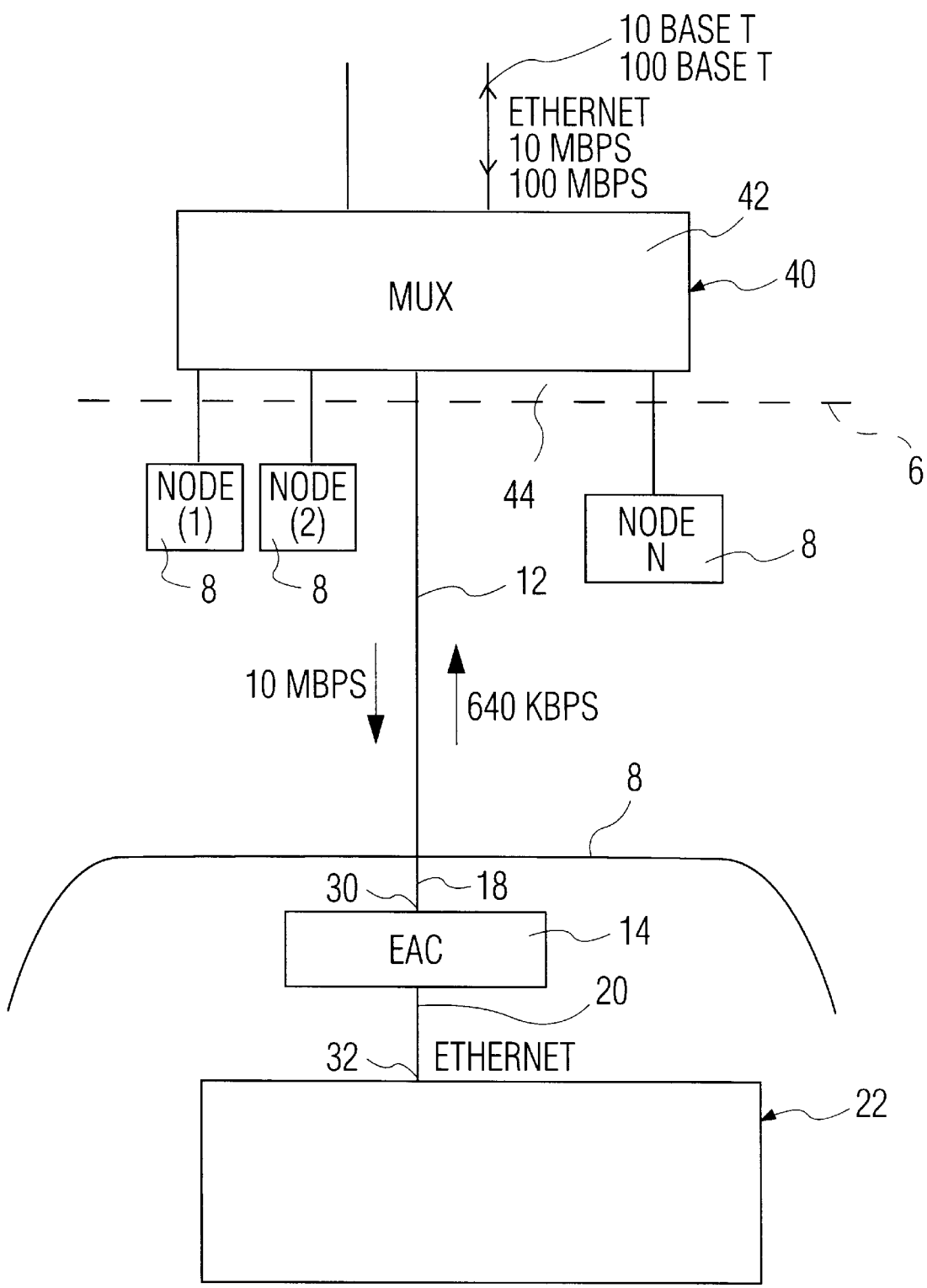
FIG. 1. is a circuit diagram of the system according to the invention.

Referring to the drawings in particular, the invention comprises a system using asymmetric full-duplex circuits to implement a switched ethernet service within a geographically distributed region (such as but not limited to a metropolitan area). The system is generally designated 10 in FIG. 1. The system provides a plurality of asymmetric full-duplex circuits 12 wherein each circuit provides an asymmetric full-duplex link between a central location 6 and a node 8.

On the node side of the link there is provided a premises device (premises device means) which converts a standard Ethernet interface (e.g. 10 MBITS/SEC, bi-directional, CSMA/CD-carrier sense multiple access/collision detection) into the asymmetric full-duplex link. This Ethernet to asymmetric converter (EAC) 14 is shown at the node 8 in FIG 1. The EAC 14 includes an asymmetric link port 18 which receives data packets from the asymmetric link at speeds of 9 MBITS/SEC and transfers the data packets to a local ethernet port 20. The EAC14 forms the CSMA/CD connection means as the ethernet port 20 is in turn connected to a network node device 22 at the network node 8. The network node device 22 can be a personal computer, LAN bridge/router, terminal server, etc. which offers an Ethernet interface. An important feature of the present invention is that the ethernet or CSMA-CD interface of the personal computer, LAN bridge/router, terminal server, etc. can employ already developed software and interconnection equipment (ethernet 10BaseT–100BaseT etc. cards).

Figure 2:
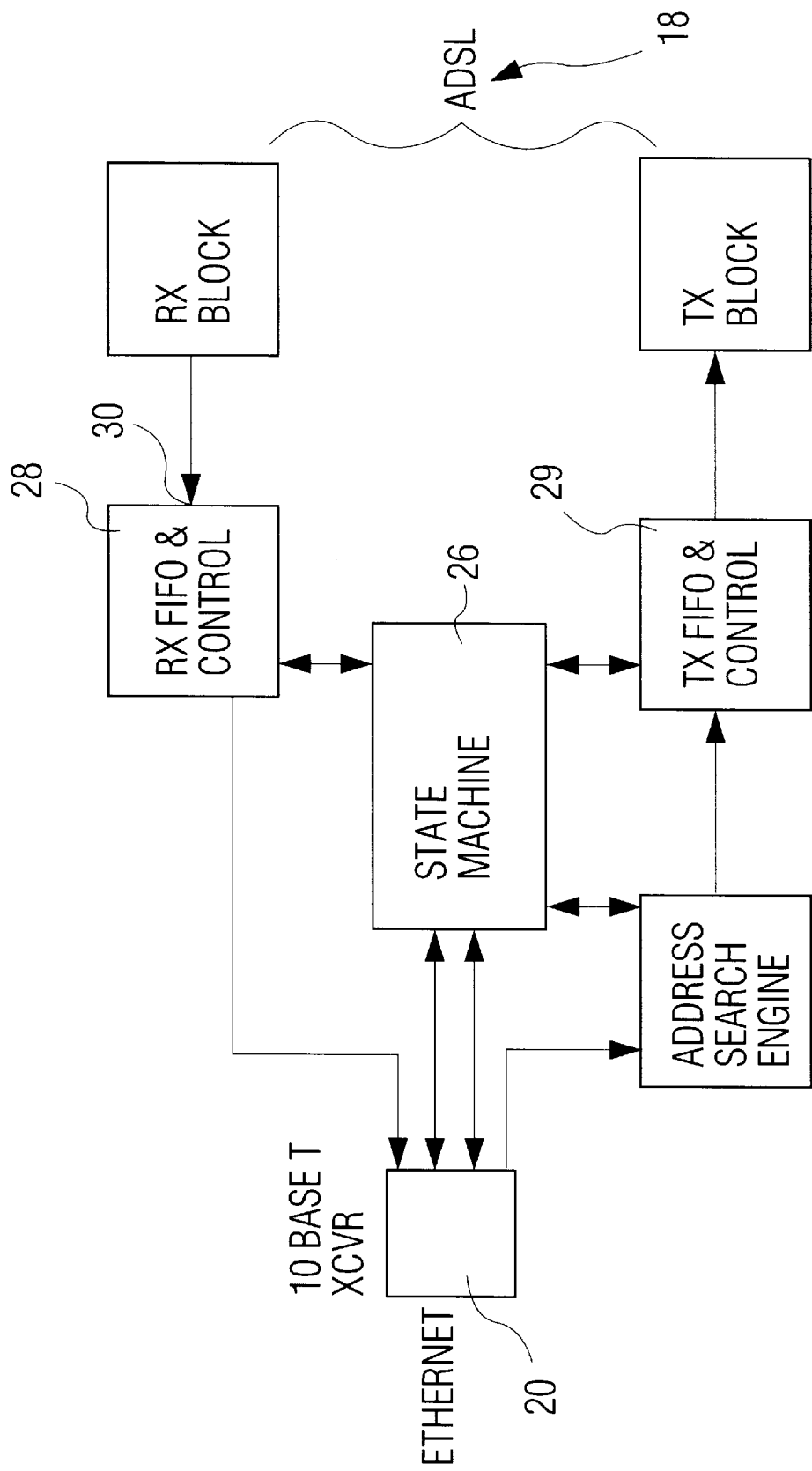
FIG. 2. is a system diagram of the ETHERNET asymmetric converter (EAC) according to the invention.

Referring to FIG. 2, the EAC generally designated 14 includes a state machine 26 as well as a receive FIFO (first in first out) memory 28 and a transmit FIFO 29. The EAC 14 includes the asymmetric link port 18 and the ethernet port 20. The asymmetric link port 18 provides an interconnection to the asymmetric full-duplex link 12 whereas the Ethernet port 20 provides a connection to the internet interface of the network node (personal computer, LAN bridge/router, terminal server, etc.).

The EAC 14 receives data packets from the asymmetric link at 30. The data packets are received at speeds up to 9 MBITS/SEC. The data packets are transferred on to the local Ethernet port 32. ALGORITHMS FOR MATCHING THE EFFECTIVE DATA RATE IN BOTH THE TRANSMIT AND RECEIVE DIRECTION ON THE LOCAL ETHERNET TO THE AVAILABLE DATA RATE ON THE ASYMMETRIC LINK According to another feature of the invention, the EAC 14 provides two algorithms which function in cooperation to match the effective data rate in both the transmit and receive direction on the local ethernet to the available data rate on the asymmetrical link. The state machine 26 forms first algorithm means and second algorithm means which provide a regulation of the data packets received from the ADSL side and the Ethernet side.

Specifically, the sum of the transmit and receive data rates on the asymmetric link is set such that (A) it does not exceed 10 MBITS/SEC, and (B)the receive data rate on the asymmetric link is much higher than the transmit data rate. It is noted that ADSL provides that the data rates always meet the above criteria A and B.

The EAC provides a first algorithm wherein the local ethernet (capable of running at up to 10 MBITS/SEC) is ensured of receiving traffic and not being busy by operating in an aggressive manner wherein the local Ethernet system does not implement the "exponential back off algorithm" as specified in the ethernet standard (see IEEE 802.3, which is hereby incorporated by reference). Instead, following a collision, the first algorithm according to the invention always begins retransmission immediately after the Ethernet interpacket gap has expired. Specifically, with ethernet, whenever a station completes a transmission, it is required to wait a minimum of 96 bit times (9.6, μsec) before beginning another transmission. Similarly, when any station is waiting to transmit, it is not allowed to start its transmission until this time window (termed "Interpacket Gap" or IPG) has elapsed. This is done in order to insure that two back-to-back packets are in fact seen as such and not as one long (and probably garbled) packet.

When a collision takes place between two Ethernet devices, each is supposed to generate a random number between O and N, multiply this by 25 μsec, and then wait until that time expires before transmitting again. "N" starts out low and increases with every subsequent collision (Exponential Backoff). If the number comes up "0", the device just waits one Interpacket Gap (the minimum required) and sends again. An Ethernet device which ALWAYS waits one Interpacket gap before resending is termed "aggressive". Normal Ethernet devices do not behave this way.

Transmissions to the Ethernet part are not interrupted as the Ethernet port 20 is able to receive the traffic. In this way, the asymmetric link will always "acquire" the Ethernet LAN if it needs to transmit data, namely retransmission is always begun immediately after the ethernet internet gap has expired.

The second algorithm used at the EAC 14 according to the invention provides that the data packets are received from the local ethernet port (at 10 MBITS/SEC), and are transferred on to the asymmetric link (assuming a transmission rate of up to 640 KBPS). The second algorithm assures that the local ethernet does not demand more bandwidth than the asymmetric link is capable of providing. To do this the algorithm generates local collisions on to the ethernet by transmitting "dummy" packets. This algorithm, by transmitting the "dummy" packets forces the local network node into its exponential back off. By employing the first algorithm and the second algorithm at the EAC 14 according to the invention, a match is provided for the effective data rate in both the transmit and receive direction on the local ethernet to be available data rate on the asymmetric link. That is, the sum of the transmit and receive data rates on the asymmetric link does not exceed 10 MBITs/per second and the receive data rate on the asymmetric link is much higher than the transmit data rate.

ETHERNET-ADSL CONVERTER (EAC) STATE MACHINE DESCRIPTION

Figure 3:
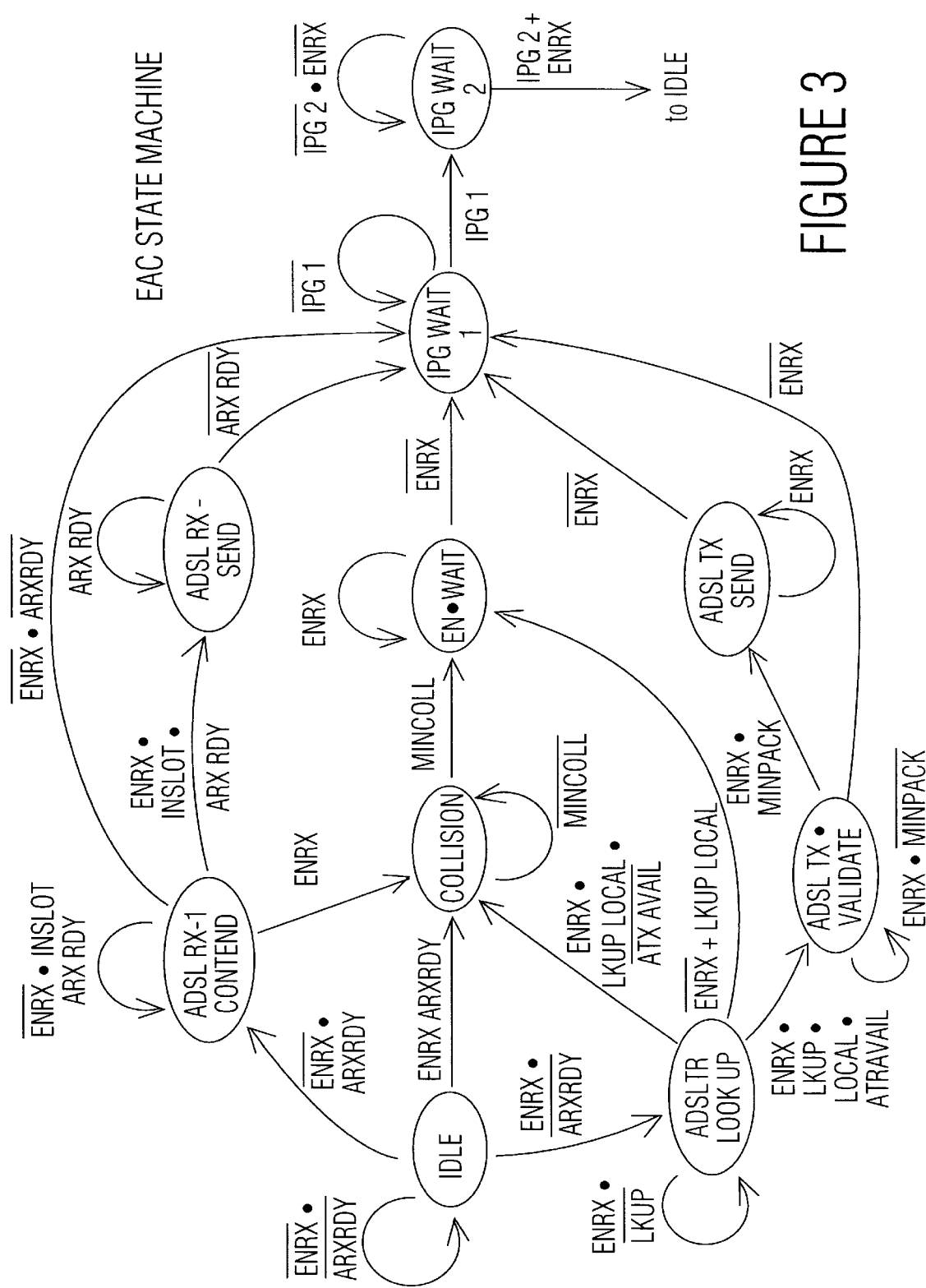
FIG. 3. is a diagram of the EAC state machine.

Referring to FIG. 3, the EAC master state machine is illustrated. In FIG. 3, the following Input Variables are referenced: ENRX: Assertion of ENRX (Ethernet Receive) indicates that a data packet is being received from another node on the local Ethernet segment. Deassertion indicates that the Ethernet segment is not busy with local traffic. Note, ENRX assertion while the converter is transmitting to the local Ethernet is an indication of local data collision.

ARXRDY: Assertion of ARXRDY (ADSL Receive Ready) indicates that a packet has been received from ADSL by the converter and is ready in the FIFO buffer to be transferred to the local Ethernet segment. ARXRDY is deasserted when the FIFO is emptied; it may be immediately reasserted if another packet us ready.

INSLOT: This is a counter output; it is asserted while transmission onto the local Ethernet is still within the Ethernet "Slot Time"(where data collisions are valid and may occur). INSLOT is deasserted once the SLot Time (approximately 50 μsec) has elapsed.

IPG1: This counter variable insures a minimum wait time in the IPG (Interpacket Gap) state. IPG1 is asserted when approximately 3.2 μsec have elapsed following entry into the IPG Wait 1 state.

IPG2: Like IPG1, this is a counter output. It is asserted after an additional 6.4 μsec have elapsed in the IPG Wait state.

MINCOLL: This is also a counter variable. MINCOLL is asserted after 6.4 μsec (the Minimum Collision Enforcement interval) has elapsed. This insures that local collisions are enforced for the appropriated duration.

LKUP: Assertion of LKUP (Lookup) signifies that an address table lookup is taking place. LKUP us deasserted when the results of the table lookup are complete.

LOCAL: Following a table lookup, LOCAL is asserted if the address is found in the table. If the address is not found in the table, LOCAL is deasserted.

ATXAVAIL: Assertion of ATXAVAIL (ADSL Transmit Available) indicates that a packet buffer in the transmit FIFO memory is available to receive a packet from the local Ethernet. When ATXAVAIL is deasserted, it signifies that all buffers are in use.

MIPACK: This counter variable is asserted when the Minimum Valid Packet Length time (approximately 50 $\mu$sec) has elapsed.

The state machine may be viewed as having two primary paths: Transmit to ADSL and Receive from ADSL. States involving collisions, packet fragments or other error conditions are mostly common. Many of the branches shown in FIG. 3 deal with unlikely exception conditions.

The IDLE state is the launch point for both paths. In this state, all counters are off, and no data is transferred either into the ADSL Transmit FIFO or out of the ADSL Receive FIFO. (Note that data may still be transferred out of the ADSL Transmit FIFO onto the ADSL line in the background.) Both the local Ethernet (ENRX) and ADSL Receive FIFO (ARXRDY) are monitored for activity in this state. If ENRX asserts, the state machine enters the Transmit to ADSL path via ADSL TX LOOKUP. If ARXRDY asserts, the state machine enters the Receive from ADSL path via ADSL RX 1. In the (unlikely) event that both assert simultaneously, the state machine immediately proceed to the COLLISION state; this is identical to receiving a collision indication while in state ADSL RX 1. However, the Transmit to ADSL path is discussed first.

State ADSL TX LOOKUP is the first state in the transmit path. While in this state, the Destination Address (DA) field of the incoming packet is copied and passed to the Lookup Engine. During this period the Lookup Engine keeps variable LKUP deasserted, indicating that it has not completed its Lookup. When the Lookup Engine is finished, it simultaneously asserts LKUP and, depending on the results of its search, either asserts or deasserts LOCAL, with the following results:

If LOCAL is asserted along with LKUP, the packet being received has a local destination and should not be forwarded to ADSL. The transmit buffer is reclaimed and the state machine proceeds to EN WAIT to wait out the transmission. In the (unlikely) event that ENRX deasserts while still in this state, the same transition is performed so that the fragment can be discarded.

If LOCAL is not asserted along with LKUP, the packet being received needs to be stored in the Transmit FIFO for transfer to ADSL. Variable ATXAVAIL is sampled to determine if a buffer is available. If ATXAVAIL is deasserted, it indicates that all buffers are currently in use; in this event, the state machine proceeds to COLLISION to generate a local collision on the Ethernet so that the sending station will retry later. If TXAVAIL is asserted, a buffer is free and the state machine proceeds to ADSL TX VALIDATE.

State ADSL_TX_VALIDATE serves to insure that the local Ethernet transmission is a valid packet, and not a fragment resulting from a collision among local nodes. Counter MINPACK asserts when the minimum legal packet size is received, and if ENRX remains asserted until this point, the state machine transitions to ADSL TX SEND. If ENRX deasserts before MINPACK asserts, however, the packet is deemed to be a fragment and the state machine transitions directly to IPG WAIT 1, releasing the transmit buffer and discarding the packet.

State ADSL_TX_SEND is entered once the packet has been determined to be both valid and destined for a non-local node. The state machine remains in this state as long as the packet is being received from the local Ethernet, and exits to IPG_WAIT_1 once the packet is over. Once this state is entered, the packet buffer is made available for transmission to ADSL (which will continue after we leave the state).

States IPG WAIT 1 and IPG WAIT 2 are common to all paths, and are always entered on the way back to IDLE. In IPGE WAIT 1, all inputs are ignored while we wait for a 3.2 $\mu$sec counter to expire (consistent with recommendations for Interpacket Gap behavior document in Ethernet/802.3 standards). In IPG WAIT 2, the state machine continues to wait until an additional 6.4 $\mu$sec elapses, but will transition immediately back to IDLE if ENRX is asserted (indicating that a new packet is being received from the local Ethernet slightly earlier than was expected).

This essentially concludes the transmit path. The Receive from ADSL path is reviewed below, followed by a summary of the remaining error states.

State ADSL_RX_1 is the first state in the receive path after exiting IDLE. While in this state, transmission of the packet out of the Receive FIFO and onto the local Ethernet begins. There is potentially a contention with other nodes on the local Ethernet, however, and ENRX is monitored as long as INSLOT is asserted. If ENRX asserts while in this state, a local collision on the Ethernet LAN has occurred and there is a transition immediately to COLLISION. If INSLOT deasserts and ENRX has not asserted, however, we have "won" the local Ethernet and transition to ADSL RX SEND. In the very unlikely event that ARXRDY deasserts while we are still in ADSL RX 1, we transition immediately to IPG WAIT 1.

We remain in state ADSL RX SEND as long as we have data to send to the local Ethernet (indicated by assertion of ARXRDY). Once the buffer is emptied, the Receive FIFO deasserts ARXDRY and we exit to IPG WAIT 1. Behavior in the Interpacket Gap states is identical to the transmit path.

State COLLISION is used by both the Transmit to ADSL and Receive from ADSL paths. While in COLLISION, we are transmitting a jamming signal to the local Ethernet. (This is either enforcing a collision between the ADSL Receive and the local Ethernet, or "jamming" a local transmission because no transmit buffer space is available.) Counter MINCOLL remains deasserted until the minimum allowed collision assertion time has expired. Upon assertion of MINCOLL, we transition to the EN WAIT state.

We remain in state EN WAIT as long as ENRX is asserted. While in this state, our own transmission to Ethernet is disabled, and we wait for the local nodes to complete transmission of any fragments or packets. This state is used in the recovery from collisions between the ADSL Receive and the local Ethernet, recovery from jamming a local node, or in waiting out a local transmission not destined for the ADSL Transmit. When ENRX is deasserted, we move on to the Interpacket Gap states.

Referring again to FIG. 1, the asymmetric link 12 is connected to a central device, namely a device generally designated 40 which aggregates traffic from many asymmetric links such as the 15 or 150 or N data links 42 including the link 12 as discussed above. All of the links 42 are similar to the link 12 as discussed above. The device 40 inspects ethernet packets as they are received at the asymmetric ports and transfers the data packets to other physical ports. The device 40 forms a means for inspecting ethernet packets. In this sense, the device 40 resembles a local area network bridge. However, according to the preferred form of the invention, the device 40 operates in the form of a multiplexer. The preferred system of the invention employs an asymmetric ethernet multiplexer (AEM) 42. As seen in FIG. 1, the AEM 42 offers a plurality of asymmetric link ports 44 connected to the asymmetric links 40. That is, according to the invention, a single AEM 42 connects to a plurality of EAC's 14. At each asymmetric link port the AEM transmits and receives inverted (so that many EAC's can connect to the AEM). The AEM 42 may have a mix of Ethernet ports that is a plurality of Ethernet ports may operate at either 10 MBIT or 100 MBIT speeds. The ports may operate in either half-duplex (standard) or full-duplex (switch enhanced) mode. All operation of the ethernet ports 44 is fully compliant with the Ethernet standards, enabling connection to any device using standard already existing equipment.

The data paths within the AEM will be referred to as "Forward"(from the many Asymmetric ports to the local Ethernets) and "Reverse"(from the local Ethernets to the Asymmetric ports). Operation of the data paths is as follows:

AEM Forward Data Path: Data packets received from the Asymmetric link are simply aggregated together and forwarded to the appropriate Ethernet port on the front panel. A simple administrative mapping of physical interfaces is the most likely method, although inspection of the logical packet (i.e. looking up the Internet Protocol Header) is not precluded. Since the maximum bandwidth for any individual port is 640 kbps, 15+ asymmetric ports may share one half-duplex 10 MBit/sec Ethernet interface without oversubscription (or 150+ if the local Ethernet is run at 100 MBits/sec). In practice, some buffer memory in the Forward path will enable effective oversubscription and increase this number. Note that the forward data path does not require any particular intelligence or high-speed operation; it is simply aggregating traffic.

AEM Reverse Data Path: Data packets received from the Ethernet link(s) are inspected for their Destination Address. This is looked up in a table which is developed to associate Destination Addresses with physical ports (this is "learned" from inspection of the forward path traffic). In this sense the Reverse Data Path of the AEM resembles a LAN bridge. Once the appropriate destination port is determined, the AEM forward the packet to the asymmetric port. Traffic with a multicast (i.e. many ports) Destination Address may be forwarded to all asymmetric ports, or may be inspected and forwarded to a subset based on administrative port groupings, IP header inspection, or other algorithms. Because the reverse data path is inherently oversubscribed, local buffer memory is provided to "ride out" demand peaks.

The AEM resembles a LAN bridge in some respects but is in fact only multiplexing he forward and reverse data paths—it is not enabling "any to any" communication among its ports. This simplifies its design considerably and thereby reduces the cost and complexity of the overall solution. Note that the AEM could be replaced with a conventional LAN interconnect device (Bridge or Router) using "inverted" EACs on its interfaces and the system would still operate. However, the simplified multiplexing of the AEM is viewed as a valuable enhancement.

While a specific embodiment of the invention has been shown and described in detail to illustrate the application of the principles of the invention, it will be understood that the invention may be embodied otherwise without departing from such principles.

What is claimed is:

1. A communication system, comprising:

ADSL means for establishing asymmetric full-duplex circuits;

a premises device including a CSMA-CD interface connected to a local network node and an asymmetric full-duplex link interface, said premises device including asymmetric to CSMA-CD connection means for controlling data passing between said CSMA-CD interface and said asymmetric full-duplex link interface, said premises device including a first memory, a second memory, first algorithm means cooperating with said first memory and said second memory to receive data packets from the said ADSL means at speeds up to 9 MBits/sec, and to transfer said data packets to said CSMA-CD interface, second algorithm means for receiving data packets from the local CSMA-CD port at 10 MBits/sec and transferring these to said asymmetric link interface and forcing said local node to not demand more bandwidth than the asymmetric link is capable of providing by simulating or generating local collisions, said network node is one of a personal computer, LAN bridge/router and terminal server which offers an CSMA-CD interface with a local CSMA-CD port; and a central device connected to said premises device via said ADSL means, said central device for aggregating traffic from a plurality of asymmetric links into one or more local CSMA-CD connection.

2. A communication system according to claim 1, wherein said premises device emulates an CSMA-CD LAN.

3. A communication system according to claim 1 wherein said first algorithm means waits for a defined CSMA-CD interpacket gap to expire and then begins retransmission to ensure that said asymmetric link means can always acquire the CSMA-CD interface if there is a need to transmit data.

4. A communication system according to claim 1 wherein said second algorithm means generates local collisions onto the CSMA-CD interface by transmitting "dummy" packets, forcing the local network node into it exponential backoff allowing data packets to be received from the local CSMA-CD port at 10 MBits/sec and to transfer these onto the Asymmetric interface at a transmission rate of up to 640 Kbps thereby ensuring the local CSMA-CD connected to the CSMA-CD interface does not demand more bandwidth than the Asymmetric link connected to the asymmetric link interface is capable of providing.

5. A communication system according to claim 1, wherein said central device is connected to physical ports and comprises means for inspecting CSMA-CD packets as they are transferred in order to determine which physical ports should receive a packet.

6. A communication system according to claim 5, wherein said central device is a local area network bridge.

7. A communication system according to claim 5, wherein said central device is an asymmetric to Ethernet multiplexer.

8. A communication system, comprising:

ADSL means for establishing asymmetric full-duplex circuits;

a premises device including
an Ethernet interface;
an asymmetric full-duplex link interface, said premises device including asymmetric to Ethernet connection means for controlling data passing between said Ethernet interface and said asymmetric full-duplex link interface, a first memory, a second memory, first algorithm means cooperating with said first memory and said second memory to receive data packets from the said ADSL means at speeds up to 9 MBits/sec, and transfer these to said Ethernet interface, and second algorithm means for receiving data packets from a local Ethernet port at 10 MBits/sec and transferring these to said asymmetric link interface and limiting bandwidth demanded by said Ethernet port by simulating or generating local collisions.

9. A communication system according to claim 8 wherein said first algorithm means waits for a defined Ethernet interpacket gap to expire and then begins retransmission to insure that said asymmetric link means can always acquire the Ethernet interface if there is a need to transmit data.

10. A communication system according to claim 8 wherein said second algorithm means generates local collisions onto the Ethernet interface by transmitting dummy packets, forcing the local network node into its exponential backoff allowing data packets to be received from the local Ethernet interface at 10 MBits/sec and to transfer these onto the asymmetric interface at a transmission rate of up to 640 kbps thereby ensuring the local Ethernet connected to the Ethernet interface does not demand more bandwidth than the asymmetric link connected to the asymmetric link interface is capable of providing.

11. A communication system according to claim 8, further comprising:

a central device connected to said premises device via said ADSL, means, said central device for aggregating traffic from a plurality of asymmetric links into one or more local Ethernet connection.

12. A communication system, comprising:

ADSL means for establishing asymmetric full-duplex circuits; and a premises device including a standard CSMA-CD interface and an asymmetric full-duplex link interface, said premises device including asymmetric to CSMA-CD connection means for controlling data passing between said CSMA-CD interface and said asymmetric full-duplex link interface wherein said premises device is attached to a network node, wherein said network node is one of a personal computer, LAN bridge/router and terminal server which offers an CSMA-CD interface and said premises device includes:

a first memory;

a second memory;

first algorithm means cooperating with said first memory and said second memory to receive data packets from the said ADSL means at speeds up to 9 MBits/sec, and to transfer said data packets to said CSMA-CD interface; and second algorithm means for receiving data packets from a local CSMA-CD port at 10 MBits/sec and transferring these to said asymmetric link interface and limiting bandwidth demanded by said Ethernet port by simulating or generating local collisions.

13. A communication system according to claim 12, wherein said premises device emulates an CSMA-CD LAN.

14. A communication system according to claim 12, wherein said first algorithm means waits for a defined CSMA-CD interpacket gap to expire and then begins retransmission to ensure that said asymmetric link means can always acquire the Ethernet interface if there is a need to transmit data.

15. A communication system according to claim 12, wherein said second algorithm means generates local collisions onto the Ethernet interface by transmitting "dummy" packets, forcing the local network node into its exponential backoff allowing data packets to be received from the local Ethernet interface at 10 MBits/sec and to transfer these onto the Asymmetric interface at a transmission rate of up to 640 kbps thereby ensuring the local Ethernet connected to the Ethernet interface does not demand more bandwidth than the asymmetric link connected to the asymmetric link interface is capable of providing.

* * * * *

UNITED STATES PATENT AND TRADEMARK OFFICE
CERTIFICATE OF CORRECTION

PATENT NO. : 5,936,963
DATED : August 10, 1999
INVENTOR(S) : Gordon C. SAUSSY

It is certified that error appears in the above-identified patent and that said Letters Patent is hereby corrected as shown below:

On the title page item [73], should read
-- Gordon C. SAUSSY, Potomac, Maryland
John James McGlew, Briarcliff Manor, --
New York Signed and Sealed this Twenty-fifth Day of April, 2000

Attest:

Q. TODD DICKINSON

*Attesting Officer*　　　　*Director of Patents and Trademarks*